United States Patent [19]

Enein

[11] 4,306,238
[45] Dec. 15, 1981

[54] MICROWAVE LANDING SYSTEMS

[75] Inventor: Mohamed H. Enein, Woking, England

[73] Assignee: Plessey Handel und Investments AG, Zug, Switzerland

[21] Appl. No.: 162,443

[22] Filed: Jun. 24, 1980

[30] Foreign Application Priority Data

Jul. 6, 1979 [GB] United Kingdom ............... 23730/79

[51] Int. Cl.³ .......................... G01S 1/16; G01S 1/18
[52] U.S. Cl. ................................................. 343/108 M
[58] Field of Search .................. 343/100 SA, 112 TC, 343/108 M, 854

[56] References Cited

U.S. PATENT DOCUMENTS

| 3,806,935 | 4/1974 | Toman | 343/108 M |
| 4,129,870 | 12/1978 | Toman | 343/108 M |
| 4,178,581 | 12/1979 | Willey, Sr. | 343/100 SA |

FOREIGN PATENT DOCUMENTS 2023940 1/1980 United Kingdom .

Primary Examiner—Theodore M. Blum
Attorney, Agent, or Firm—Fleit & Jacobson

[57] ABSTRACT

A system of operation for a scanning beam microwave landing system having aerial means for scanning a narrow microwave beam TO and FRO through a scanned angular sector and for transmitting signals with relatively wider beam patterns to cover sectors to the left and to the right of the scanned sector comprises, energizing the aerial means before the TO scan begins to produce the said relatively wider beam pattern on the left of the scanned sector at a time corresponding to a predetermined negative angle of scan with reference to the center line of the scanned sector which is outside the angular limit of the scanned sector, energizing the aerial means after the TO scan finishes to produce the said wider beam pattern on the right of the scanned sector at a time corresponding to the said predetermined angle of scan but positive with respect to the center line through the scanned sector which is outside the angular limit of the scanned sector, energizing the aerial means before the FRO scan begins to produce the said wider beam pattern again on the right of the scanned sector and at a time corresponding to the said positive predetermined angle as applied to the scan which is outside the angular limit of the scanned sector and energizing the aerial means after the FRO scan has finished to produce the said wider beam pattern on the left of the scanned sector at a time corresponding to the said negative predetermined angle of the scan which is outside the angular limit of the scanned sector, wherein the aerial means comprises one aerial array which is adapted to transmit the said wider beam pattern at different angles.

8 Claims, 8 Drawing Figures

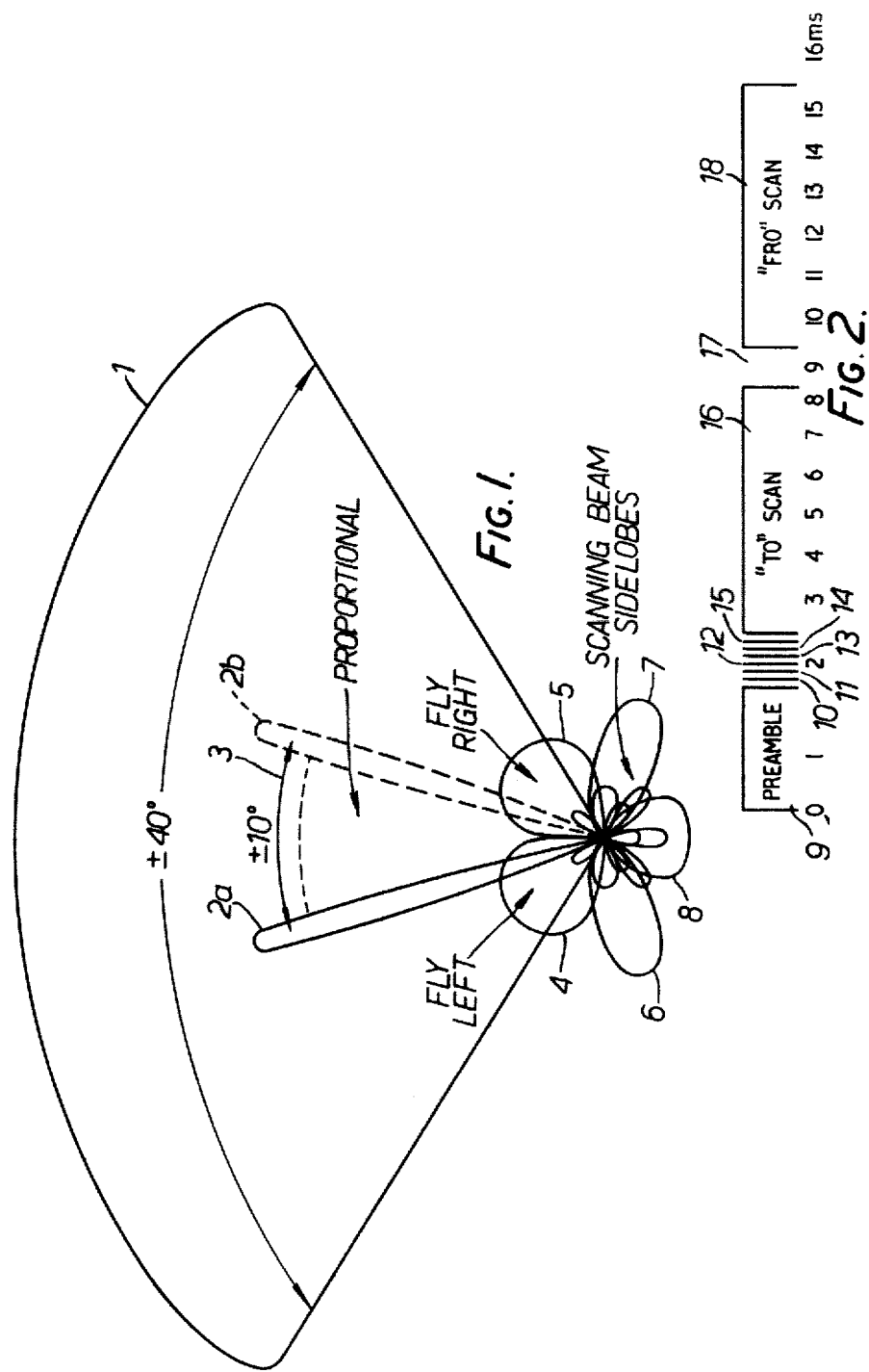

| SCANNING BEAM GRATING LOBE LEVEL | CLEARANCE GRATING LOBE LEVEL | SCAN COVERAGE | NO. OF ELEMENTS | ELEMENT SPACING | LENS INPUTS | | |
|---|---|---|---|---|---|---|---|
| | | | | | SCAN | CLEARANCE | TOTAL |
| −20dB | −13dB | ±12 | 6 | 0·6λ | 8 | 6 | 14 |

| SCANNING BEAM BEAM WIDTH | SCAN COVERAGE | NO. OF SUB-ARRAYS | NO. OF PHASE SHIFTERS | NO. OF SWITCHES |
|---|---|---|---|---|
| 2° | ±12° | 10 | 10 | 140 |
| 3° | ±13° | 7 | 7 | 98 |

| SCANNING BEAM. BEAM WIDTH | CLEARANCE BEAM WIDTH | SCAN COVERAGE | NO. OF ELEMENTS | ELEMENT SPACING | LENS INPUTS | | |
|---|---|---|---|---|---|---|---|
| | | | | | SCAN | CLEARANCE | TOTAL |
| 2° | 7·5° | ±12° | 64 | 0·54λ | 12 | 8 | 20 |
| 3° | 10° | ±13° | 42 | 0·54λ | 8 | 6 | 14 |

MICROWAVE LANDING SYSTEMS

This invention relates to scanning beam microwave landing systems for aircraft. A scanning beam microwave landing system has now been accepted as a standard navigational aid for the future by a number of countries. This system was introduced by the U.S.A. and comprises a ground station including means for scanning a narrow microwave beam TO and FRO through an angular sector in azimuth and in elevation, apparatus being carried by an aircraft to detect the beam as it passes and to provide in dependence upon such detection an indication of aircraft position relative to the centre line of the sector scanned. This system is now well known and aircraft position is determined in dependence upon the time between detection of the TO and FRO beams by the apparatus carried by the aircraft. One of the characteristics of this system is that an aircraft outside the scanned sector may receive due to multipath effect reflected signals giving an erroneous indication that it is within the sector scanned.

In order to obviate this anomaly it is proposed that in addition to the aerial array required for scanning the sector, out of coverage indicator (OCI) aerials should also be used to provide an out of coverage (that is out of the scanned sector) beam pattern. The out of coverage aerials are energised before the scan and data relating to the signal strength of these signals is stored by apparatus carried by the aircraft and compared with the amplitude of scanned signals subsequently received. The signal strength of the OCI signals is arranged to be such that when the aircraft is within the scanned sector, received scanned signals will always be larger than OCI signals and thus when the scan signals are smaller than the OCI signals they are regarded as being due to multipath effects and rejected. This system although now accepted can be shown to be unsatisfactory under certain site conditions and a good scan or angle guidance signal might be incorrectly rejected or a false scan or angle guidance signal may be accepted. This shortcoming of the present system is due at least in part to the fact that the necessarily broad antenna patterns of the OCI aerials are much more susceptible to multipath signals than the scanned signal which provides guidance.

It is required in some systems to limit the sector coverage scanned say from 40° to 10° or 20° and in this case further aerials are provided known as clearance aerials which provide clearance signals which are radiated from the clearance aerials and stored by apparatus carried by the aircraft. These stored clearance signals are compared with the amplitude of the received scanned signal, whereby the position of an aircraft with respect to the centre line of the limited scanned sector may be determined. In practice the TO and FRO scan signals are prefixed firstly by a preamble comprising data signals indicating the function of the scan (i.e. elevation or azimuth). The preamble is followed by left and right clearance signals which are recoved and stored by the apparatus aboard the aircraft. The clearance signals are followed by left, right, and possibly rear OCI signals which are also stored. The OCI signals are then followed by the TO and FRO scan signals. It will be appreciated that with limited sector coverage involving the use of clearance signals in addition to OCI signals, the change from clearance to linear guidance by means of the scanned beam will now occur much closer to the sector centre and a long time constant can no longer therefore be used to smooth out scalloping multipath signals. Secondly the aircraft will probably be lower in altitude during the transition to linear guidance since a limited guidance sector is being used and will therefore experience a higher level of multipath signals and thirdly the reduced linear coverage or sector angle scanned will make it much more difficult to allow for any region of uncertainty. It will be appreciated therefore in view of the foregoing, that with limited sector coverage using clearance signals in addition to OCI signals the system will be much more susceptible to errors due to multipath effects.

It is an object of the present invention to provide a scanning beam microwave landing system in which the problems outlined above are obviated or at least significantly reduced.

According to the present invention, a system of operation for a scanning beam microwave landing system having aerial means for scanning a narrow microwave beam TO and FRO through a scanned angular sector and for transmitting signals with relatively wider beam patterns to cover sectors to the left and to the right of the scanned sector comprises, energising the aerial means before the TO scan begins to produce the said relatively wider beam pattern on the left of the scanned sector at a time corresponding to a predetermined negative angle of scan with reference to the centre line of the scanned sector which is outside the angular limit of the scanned sector, energising the aerial means after the TO scan finishes to produce the said wider beam pattern on the right of the scanned sector at a time corresponding to the said predetermined angle of scan but positive with respect to the centre line through the scanned sector which is outside the angular limit of the scanned sector, energising the aerial means before the FRO scan begins to produce the said wider beam pattern again on the right of the scanned sector and at a time corresponding to the said positive predetermined angle as applied to the scan which is outside the angular limit of the scanned sector and energising the aerial means after the FRO scan has finished to produce the said wider beam pattern on the left of the scanned sector at a time corresponding to the said negative predetermined angle of the scan which is outside the angular limit of the scanned sector, wherein the aerial means comprises one aerial array which is adapted to transmit the said wider beam pattern at different angles.

It will be appreciated that the scanned angular sector may be in azimuth and/or in elevation and that the system of operation may be used for clearance or O.C.I. purposes.

The said wider beam pattern may also be scanned so as to sweep through sub sectors on either side of the said scanned angular sector.

The aerial array may be adapted to produce both the said narrow beam and the said wider beam.

The array may comprise a plurality of sub arrays each comprising a plurality of aerial elements fed from microwave signal distributor means having a plurality of input ports fed sequentially from a controllable phase shift device via switch means.

The said phase shift device may be fed from a standing wave tube.

The signal distributor means may be adapted to provide a beam the width of which is variable in accordance with operation of the switch means to provide the said wider beam pattern on each side of the sector covered by the said narrow scanned beam The signal distribution means may comprise a Butler Matrix, a Blass Matrix or a Rotman Lens arranged as described in our GB Pat. No. 2,023,940A or in our co-pending U.S. Pat. Application Ser. No. 048,379.

Alternatively the array may comprise a plurality of aerial elememts fed from a microwave lens such as a Rotman lens having input ports fed with a microwave signal via switch means from a microwave modulator. The modulator may be fed with a microwave signal developed in a standing wave tube.

It will be appreciated that similar arrays are required both for azimuth and elevation.

Some embodiments of the invention will now be described by way of example with reference to the accompanying drawings in which:

FIG. 1 is a generally schematic diagram showing the beam patterns formed in a known scanning beam microwave landing system;

FIG. 2 is a diagram showing the signals radiated to form the beam patterns shown in FIG. 1;

Figures 3, 4, 5:
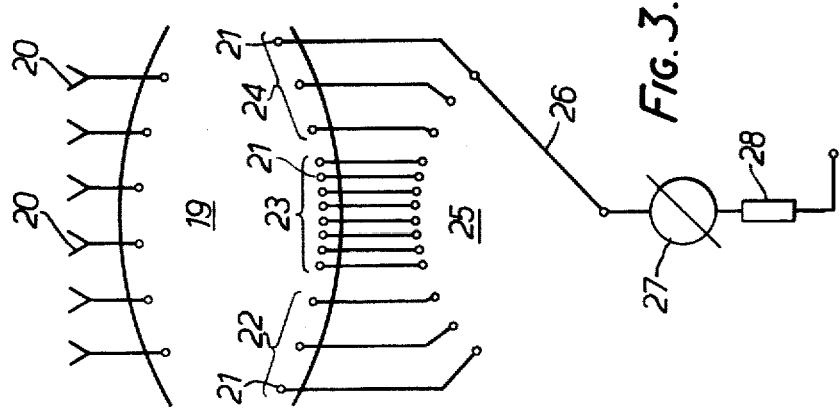
FIG. 3 is a generally schematic circuit diagram of a sub-array including a phase shifter.
FIGS. 4 and 5 are tables appertaining to the performance of an array comprising a plurality of sub-arrays each as shown in FIG. 3.

Referring now to FIG. 1 in a known scanning beam microwave landing system data might be transmitted through an angle of 40° as indicated by the sector 1. The scanned beam or proportional guidance signal has a narrow beam width as shown at 2a and 2b and is scanned TO and FRO across a narrow 10° sector 3. In order to provide an indication for aircraft which are outside the sector 3 of their position, two further signals 4 and 5 are radiated to the left and right respectively of the sector 3, the amplitude of the signals radiated at 4 and 5 being compared by apparatus on the aircraft with the scanned signal to provide a positional indication. Thus in a known system left and right clearance beams 4 and 5 are provided outside the scanned beam 3 or proportional guidance region to achieve performance similar to the well known instrument landing system (ILS) clearing function. In order to preclude receiver operation in areas outside the 40° sector 1, up to three OCI or side lobe suppression signals left, right, and rear corresponding to the lobes 6, 7 and 8 are radiated on separate aerials and the pulse amplitude of these signals is detected and compared with the amplitude of the scanned beam or proportional guidance signal. The amplitudes of the radiated signals are arranged such that if the amplitude of the received scanning beam signal is less than the signals transmitted in the beams 6, 7 and 8 then the received scanning beam signal is classified as erroneous and is suppressed.

Referring now to FIG. 2 the signals are transmitted in the following order, firstly a preamble data signal 9 is transmittd followed by left and right clearance signals 10 and 11. The clearance signals are followed by left, right and rear OCI or side lobe suppression signals 12, 13 and 14. The OCI signals are followed by a test pulse 15 the function of which is not important and which will not be explained herein. Following the test pulse the TO scan is executed whereby the beam 2a is scanned from left to right so that it assumes the position 2b as shown. After a period as shown in FIG. 2, the FRO scan is executed whereby the beam is scanned from the position 2b as shown in FIG. 1 to the position 2a through an angle of 10°.

The system thus far described is well known but has certain disadvantages which can result in the erroneous rejection of scanned beam proportional guidance signals or the acceptance of erroneous signals. As just before mentioned the known clearance and OCI comparison techniques of the present U.S. system rely on amplitude comparision of the OCI and/or the clearance signals with he scanning beam signal and in the known system this can result in unsatisfactory performance due to factors which have hereinbefore already been discussed.

It is proposed herein to replace the data like clearance and OCI signals by signals occuring within the scanned period which can be processed in the same way as the scanning beam is processed. This may be achieved as described in our co-pending Pat. Application Ser. No. 048,379 by transmitting TO and FRO synthetic pulses via the appropriate separate clearance and OCI aerials at predetermined angles within the TO and FRO scan/time slot but outside the actual sector scanned. The TO and FRO pulses of the left OCI antenna would be transmitted at a time equivalent to an angle of say −50° in the scan time slot. The TO and FRO pulses of the right OCI antenna will be transmitted from the right OCI antenna at a time equivalent to plus 50° in the scan/time slot. These synthetic OCI pulses are arranged to have a length corresponding to the beam width of the scanning beam signal.

The manner in which the synthetic signals are generated and transmitted is described with reference to FIGS. 3, 4 and 5 of our co-pending patent specification to which attention is hereby directed.

In the arrangement described in our co-pending patent specification pulsed clearance signals are transmitted from individual aerials which radiate over a wide angle to fully cover the specified clearance sectors. This is quite satisfactory for many applications but where still further protection against multipath effects is required a system as hereinafter described may be used.

According to one embodiment an aerial array may be used comprising a number of sub-arrays each as shown in FIG. 3. Each sub-array comprises a Rotman Lens 19 or the like which is arranged to feed six aerial elements 20. The Lens is fed from a number of input ports 21 arranged in three groups 22, 23 and 24. The input ports are coupled to a microwave switch 25 comprising PIN diodes, the wiper 26 of which is fed from a controlled phase shift device 27 which in turn is fed with microwave energy from a travelling wave tube 28. Operation of a beam steering or scanning system comprising sub-arrays of the kind shown in FIG. 3 is described in our G.B. Pat. No. 2023940 and corresponding U.S. Pat. Application Ser. No. 048,379. The present arrangement however differs from those already described in that the input ports to the lens 19 are not evenly spaced. The group of ports 23 is quite narrowly spaced to provide a narrow beam for proportional guidance purposes whereas the groups 22 and 24 are spaced more widely to produce a wider beam for OCI purposes. As shown in the tables of FIGS. 4 and 5 the number and spacing of the input ports and aerial elements and sub-arrays may be chosen in accordance with the specification required. In the present example six aerial elements 20 are provided with a spacing of 0.61 λ. Eight lens inputs are provided in the group 23 to provide a narrow beam arranged to sweep through a 12° proportional guidance sector and three clearance lens inputs are provided in each of the groups 22 and 24 to provide clearance signals which are scanned using known techniques through clearance sub-sectors of 30° adjacent to the proportional guidance sector. As shown in the table, during operation of the scanning beam in the proportional guidance sector the grating lobe level is better than −20 dB and for transmission of clearance signals from the ports 22 or 24, the grating lobe level is −13 dB. In order to provide a scanning beam width of 2° ten sub-arrays are required with ten corresponding phase shifters and therefore 140 switches will be needed. If some relaxation to a scanning beam width of 3° is allowed in the proportional guidance sector, then only 7 sub-arrays, 7 phase shifters, and 98 microwave switches would be needed. In the present arrangement, the groups of input ports 22 and 24 are scanned to provide clearance coverage in sub-sectors of ±30° on either side of the 12° proportional guidance sector, wherein the scan rate in the proportional guidance sector is the same as the scan rate in the adjacent subsectors so that the 30° subsectors are scanned on one side of the proportional guidance sector in the time slot between +12° and +42° and on the other side of the proportional guidance sector in the time slot between −12° and −42°. The main lobe beam width in the subsectors is norminally the same as in the proportional sector but due to the presence of relatiely high level grating lobes, vis −13dB, the beam must in effect be considered to be wider than in the proportional guidance sector. In an alternative embodiment of the invention as just before described with reference to FIG. 3 the Rotman lens may be replaced by a suitably designed Butler Matrix or Blass Matrix. These techniques are well understood by those skilled in the art and such matrixes are described in our G.B. Pat. Application No. 2023940A and in our corresponding U.S. Pat. Application Ser. No. 048,379.

Figures 6, 7:
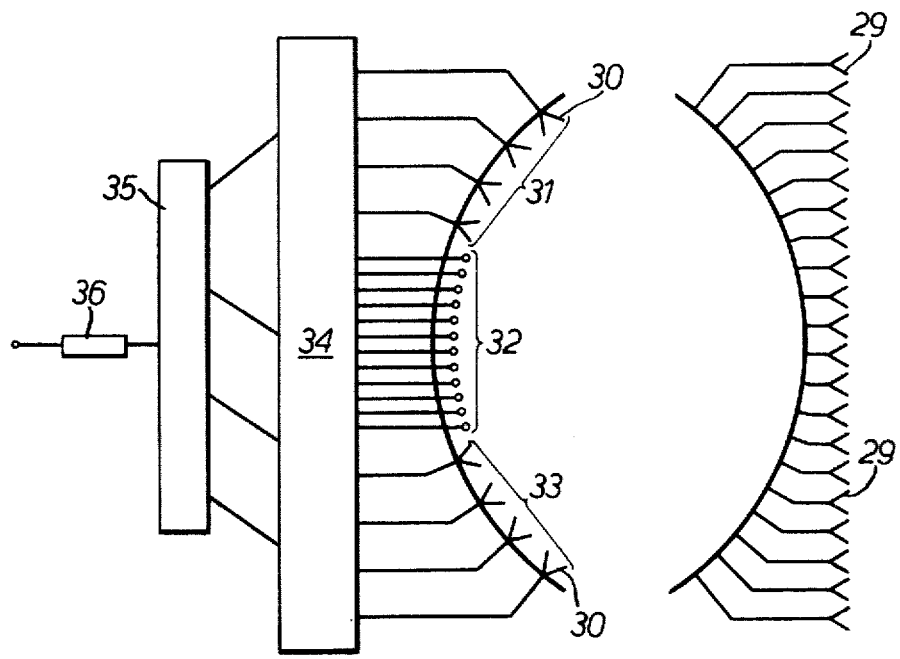
FIG. 6 is a generally schematic circuit diagram of an aerial array arrangement using a lens and fed from a modulator.
FIG. 7 is a table appertaining to the perforance of the arrangements shown in FIG. 6.

As an alternative to the system just before described which uses phase shifters, a beam former may be used as shown in FIG. 6 utilizing aerial elements 29 which are fed from a Rotman lens having input ports 30 arranged in three groups 31, 32 and 33. The groups 32 is used to provide the proportional guidance scanning beam signals and the groups 31 and 33 are used to provide clearance signals. The input ports 30 are fed from a bank of PIN diode microwave switches 34 which in turn are fed from a modulator 35 which receives a microwave signal from a travelling wave tube 36.

As shown in the table of FIG. 7, twelve lens input ports in the group 32 are arranged to feed sixty four aerial elements 29 having an element spacing of 0.45 λ. Eight clearance input ports are provided in the groups 31 and 33 which gives a total of twenty lens input ports. With this arrangement a 2° scanning beam width is provided to cover the 12° proportional guidance sector and on either side of this 12° proportional guidance sector, two sub-sectors of 30° each are provided which are scanned by the clearance input groups 31 and 33 with a static beam width of 7.5° with no significant grating lobes to give clearance coverage in the sub-sectors ±30° the scanning rate being about three times as fast in the 30° subsectors as in the 12° proportional guidance sector, whereby the dynamic bean pattern received by airbourne equipment is similar to the system described with reference to FIG. 3. The table shows also the scanning beam width and associated parameters for a 3° scanning beam.

By utilizing an arrangement as just before described with reference to FIG. 3 or with reference to FIG. 6 in which clearance beams are provided, which although wider than the proportional guidance beam are still narrower than the clearance sector to be covered, which therefore must be scanned, an arrangement is afforded in which multipath effects are significantly reduced as would be expected. By modifying the design of the Rotman lens to provide acceptably wider beams in the clearance sub-sectors than in the proportional guidance sector, significant economies are made since relatively fewer lens inputs are fewer switches are required, and it will be appreciated that in the case of the arrangement described with reference to FIG. 3 relatively fewer phase shifters are required.

An important advantage of using one aerial array for both the proportional guidance signal and the clearance signal is the generation of a beam which results in protection against in beam multipath effects without extra cost. In fact, cost savings may be made which will depend on the beam forming implementation. If microwave optics is used, cost saving will be apprecable without compromising system integrity.

It will be appreciated that the airbourne receiver decodes all signals within the time slot allocated for the scanning beam vis ±60°. If the angle decoded is greater than the proportional guidance sector coverage promulated by the ground system which is always between 10° and 40°, the airbourne receiver will use this signal as a clearance signal and it will display either "fly left" or "fly right" depending on the time coding of the received signal. Although it is desirable for the clearance signal amplitude to be less than the amplitude of the proportional guidance signal, in order to guarantee the integrity of the proportional guidance signal and to protect against multipath effects from the clearance zone, the absolute amplitude is not important. Because the receiver uses the clearance signals only to provide a "fly right" or "fly left" indication, the following parameters in the clearance zone become non-essential to the accuracy and integrity of the system.

1. Time coding in the clearance zone does not have to be linear with time and at 20,000° per second scan rate as required in the proportional guidance sector.

2. Beam pointing accuracy is not critical if time coding exceeds the limits of the proportional guidance sector.

3. The radiation of side lobe patterns is allowed to reach much higher levels vis −13dB in the clearance region. This relaxation in the accuracy requirements in the clearance zone can benefit systems using optical or digital means to scan the beam through wide angles in the clearance zone using all or part of the radiating aperture to provide clearance with the same main beam width, if all the aperture is used of the scanning beam but with high side lobes and less beam pointing accuracy.

Figure 8:
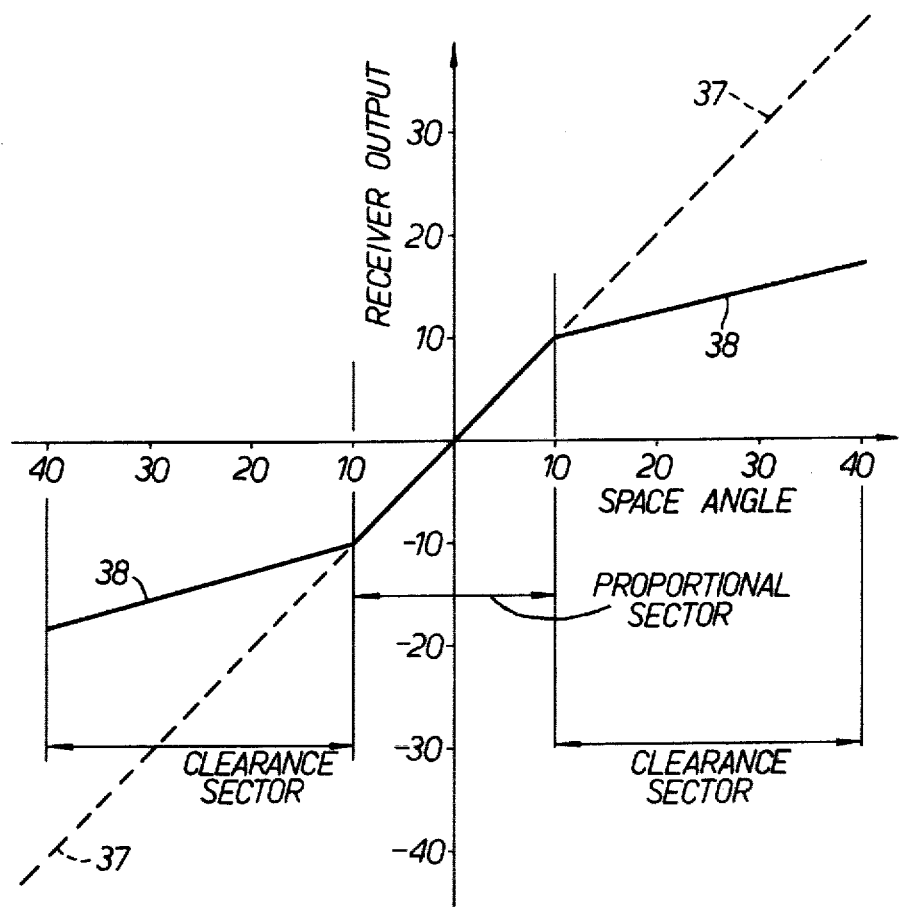
FIG. 8 is a graphical diagram illustrating variation in output of the airbourn receiver of a microwave landing system with space angle.

It will be appreciated that the scan rate in the proportional guidance sector need not be the same as in the clearance sector and this is clearly illustrated in FIG. 8 wherein receiver output is plotted against space angle for a microwave lens system and in which a characteristic is achieved in the clearance subsectors for the system using phase shifters and described with reference to FIG. 3 as shown by the broken lines 37, whereas for the other system described with reference to FIG. 6 a characteristic is achieved in the clearance subsectors as indicated by the lines 38.

What we claim is:

1. A system of operation for a scanning beam microwave landing system having aerial means for scanning a narrow microwave beam TO and FRO through a scanned angular sector and for transmitting signals with relatively wider beam patterns to cover sectors to the left and to the right of the scanned sector comprises, energising the aerial means before the TO scan begins to produce the said relatively wider beam pattern on the left of the scanned sector at a time corresponding to a predetermined negative angle of scan with reference to the centre line of the scanned sector which is outside the angular limit of the scanned sector, energising the aerial means after the TO scan finishes to produce the said wider beam pattern on the right of the scanned sector at a time corresponding to the said predetermined angle of scan but positive with respect to the centre line through the scanned sector which is outside the angular limit of the scanned sector, energising the aerial means before the FRO scan begins to produce the said wider beam pattern again on the right of the scanned sector and at a time corresponding to the said positive predetermined angle as applied to the scan which is outside the angular limit of the scanned sector and energising the aerial means after the FRO scan has finished to produce the said wider beam pattern on the left of the scanned sector at a time corresponding to the said negative predetermined angle of the scan which is outside the angular limit of the scanned sector, wherein the aerial means comprises one aerial array which is adapted to transmit the said wider beam pattern at different angles.

2. A System of operation as claimed in claim 1 wherein said wider beam pattern is also scanned so as to sweep through sub sectors on either side of the said scanned angular sector.

3. A system of operation as claimed in claim 1 or claim 2 wherein the aerial means utilised is adapted to produce both the said narrow beam and the said wider beam.

4. A system of operation as claimed in claim 3 wherein the aerial array utilise comprises a plurality of sub arrays each of which includes a plurality of aerial elements fed from microwave signal distributor means having a plurality of input ports fed sequentially from a controllable phase shift device via switch means.

5. A system as claimed in claim 4 wherein the phase shift device is fed from a standing wave tube.

6. A system as claimed in claim 4 or claim 5 wherein the signal distribution means comprises a Rotman lens a Butler Matrix or a Blass Matrix.

7. A system as claimed in claim 3 wherein the aerial array comprises a plurality of aerial elements fed from a len having input ports fed with a microwave signals via switch means from a microwave modulator.

8. A system as claimed in claim 7 wherein the modulator is fed with a microwave signal developed in a standing wave tube.

* * * * *